(12) United States Patent
Kutsuki

(10) Patent No.: US 12,436,605 B2
(45) Date of Patent: Oct. 7, 2025

(54) INFORMATION PROCESSING DEVICE AND INFORMATION PROCESSING METHOD

(71) Applicant: SONY GROUP CORPORATION, Tokyo (JP)

(72) Inventor: Haruka Kutsuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/693,575

(22) PCT Filed: Aug. 8, 2022

(86) PCT No.: PCT/JP2022/030267
§ 371 (c)(1),
(2) Date: Mar. 20, 2024

(87) PCT Pub. No.: WO2023/058321
PCT Pub. Date: Apr. 13, 2023

(65) Prior Publication Data
US 2024/0385683 A1 Nov. 21, 2024

(30) Foreign Application Priority Data
Oct. 4, 2021 (JP) .................................. 2021-163526

(51) Int. Cl.
*G06F 3/01* (2006.01)
*G06V 40/10* (2022.01)

(52) U.S. Cl.
CPC .............. *G06F 3/011* (2013.01); *G06V 40/10* (2022.01)

(58) Field of Classification Search
CPC ............. G06F 3/011; G06T 11/60; G06T 7/33
See application file for complete search history.

(56) References Cited

U.S. PATENT DOCUMENTS 11,861,255 B1 * 1/2024 Ive ....................... G06V 40/174
2013/0308835 A1 * 11/2013 Thorson ............ H04M 1/72463
382/118

(Continued)

FOREIGN PATENT DOCUMENTS

| JP | 2006-004197 A | 1/2006 |
| JP | 2011-013373 A | 1/2011 |
| JP | 2020-182680 A | 11/2020 |

OTHER PUBLICATIONS

International Search Report and Written Opinion of PCT Application No. PCT/JP2022/030267, issued on Sep. 27, 2022, 09 pages of ISRWO.

(Continued)

*Primary Examiner* — Yuzhen Shen
(74) *Attorney, Agent, or Firm* — CHIP LAW GROUP

(57) ABSTRACT

An information processing device that executes processing for processing and presenting an image is provided. The information processing device includes an analysis unit that analyzes a state of a user and estimates a changed state of the user, a setting unit that sets a parameter value for image adjustment so as to be adapted to the changed state of the user, and an adjustment unit that adjusts a parameter of a target image on the basis of the parameter value set by the setting unit. The analysis unit analyzes a state of the user at a current age and estimates a state of the user at another age, and the setting unit sets a parameter value so as to be adapted to the state of the user at the other age.

13 Claims, 6 Drawing Sheets

(56) References Cited

U.S. PATENT DOCUMENTS

| | | | |
|---|---|---|---|
| 2015/0213331 A1* | 7/2015 | Peng | G06F 18/22 |
| | | | 382/165 |
| 2016/0085420 A1* | 3/2016 | Agarwal | G06F 3/011 |
| | | | 715/765 |
| 2018/0276883 A1 | 9/2018 | D'Alessandro et al. | |
| 2019/0244257 A1* | 8/2019 | Goldman | G06Q 30/0276 |
| 2022/0083133 A1* | 3/2022 | Ito | G06F 3/013 |

OTHER PUBLICATIONS

Goodfellow, et al., "Generative Adversarial Networks", arxiv.org, Jun. 10, 2014, 09 pages.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/030267 filed on Aug. 2, 2022, which claims priority benefit of Japanese Patent Application No. JP 2021-163526 filed in the Japan Patent Office on Oct. 4, 2021. Each of the above-referenced applications is hereby incorporated herein by reference in its entirety.

TECHNICAL FIELD

The technology disclosed herein (hereinafter, referred to as "present disclosure") relates to an information processing device, an information processing method, and a computer program that execute processing for processing and presenting an image.

BACKGROUND ART

A method has been known for performing sepia-tone conversion or monotone conversion on a color image as a video expression that evokes a sense of past or a retro feeling. For example, many image editing applications implement functions for performing sepia-tone conversion or monotone conversion on an image. Furthermore, there is a digital camera that includes a filter that converts a captured image in an RGB format into a sepia tone or monotone.

However, a past visual experience of a person is not actually a sepia-tone image. From hardware restrictions that only monotone videos can be recorded in the past, many people tend to associate a sense of past from sepia tone or monotone images. That is, there has been no video expression that can realistically reproduce the past visual experience.

Note that a visual simulation experience device has been proposed that can easily reproduce an average appearance at an age at which simulation experience is desired and easily design a product in consideration of a universal design (refer to Patent Document 1). This visual simulation experience device simulates a low eyesight state of visually impaired persons, elderly persons, infants, or the like but does not simulate a past vision of a user. Furthermore, this visual simulation experience device merely reproduces the average appearance via a physical filter (lens or the like) and does not reproduce a visual experience of each user.

Note that, although the term "viewpoint" has other meanings such as "position of eye", the term "viewpoint" is used as the meaning of "appearance" here.

CITATION LIST

Patent Document

Patent Document 1: Japanese Patent Application Laid-Open No. 2011-13373

Non-Patent Document

Non Patent Document 1: Generative Adversarial Networks, Ian J. Goodfellow et al. <https://arxiv.org/abs/1406.2661>

SUMMARY OF THE INVENTION

Problems to be Solved by the Invention

An object of the present disclosure is to provide an information processing device, an information processing method, and a computer program that execute processing for processing and presenting an image on the basis of a psychological state or a physiological state of a user.

Solutions to Problems

The present disclosure has been made in consideration of the above problems, and a first aspect is an information processing device including:
   an analysis unit that analyzes a state of a user and estimates a changed state of the user;
   a setting unit that sets a parameter value for image adjustment so as to be adapted to the changed state; and
   an adjustment unit that adjusts a parameter of a target image on the basis of the parameter value set by the setting unit.

The change of the state includes a change according to an age of the user. In this case, the analysis unit analyzes a state of the user at a current age and estimates a state of the user at another age, and the setting unit sets a parameter value so as to be adapted to the state of the user at the other age.

The analysis unit estimates the changed state of the user, on the basis of personal data of the user and general human characteristic data. The information processing device according to the first aspect may further include an input unit that inputs the personal data of the user.

Furthermore, the state of the user may include at least one of a psychological state or a physiological state of the user. In this case, the analysis unit estimates a change of at least one of the psychological state or the physiological state of the user. Then, the setting unit sets the parameter value so as to adapt to the changed psychological state and physiological state.

Furthermore, a second aspect of the present disclosure is an information processing method including:
   an analysis step of analyzing a state of a user and estimating a changed state of the user;
   a setting step of setting a parameter value for image adjustment so as to be adapted to the changed state; and
   an adjustment step of adjusting a parameter of a target image on the basis of the parameter value set in the setting step.

Furthermore, a third aspect of the present disclosure is a computer program written in a computer-readable format for causing a computer to function as
   an analysis unit that analyzes a state of a user and estimates a changed state of the user,
   a setting unit that sets a parameter value for image adjustment so as to be adapted to the changed state, and
   an adjustment unit that adjusts a parameter of a target image on the basis of the parameter value set by the setting unit.

The computer program according to the third aspect of the present disclosure is defines a computer program written in a computer-readable format in such a manner as to implement predetermined processing in the computer. In other words, by installing the computer program according to the third aspect of the present disclosure in the computer, a cooperative action is exerted on the computer, and a similar operation and effect to those of the information processing device according to the first aspect of the present disclosure can be obtained.

Effects of the Invention

According to the present disclosure, it is possible to provide an information processing device, an information processing method, and a computer program that processes an image according to a psychological state or a physiological state of a user and present the image to the user.

Note that the effects described in the present specification are merely examples, and the effects brought by the present disclosure are not limited thereto. Furthermore, the present disclosure may further provide additional effects in addition to the effects described above.

Still other objects, features, and advantages of the present disclosure will become apparent from a more detailed description based on embodiments as described later and the accompanying drawings.

MODE FOR CARRYING OUT THE INVENTION

Figure 1:
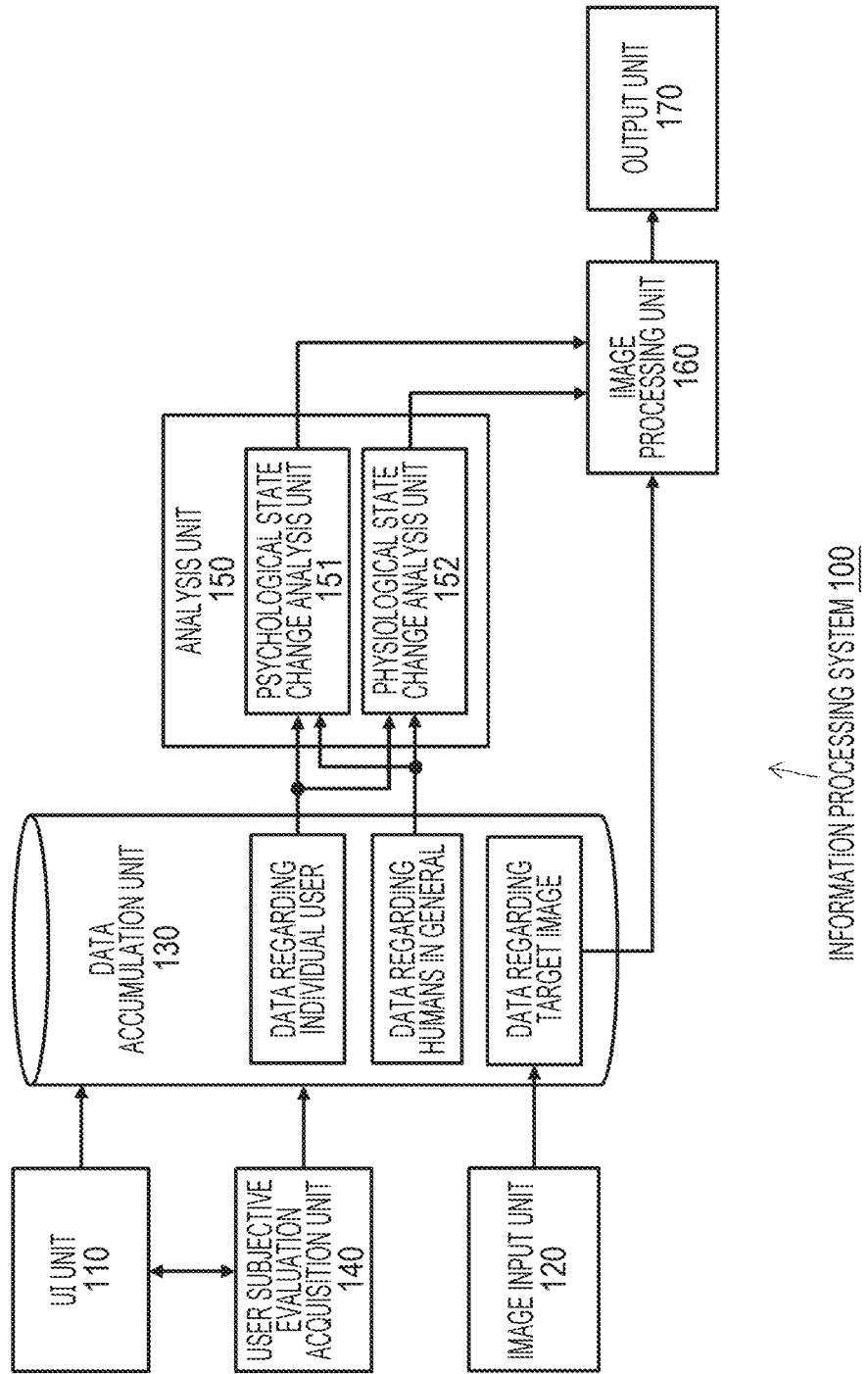
FIG. 1 is a diagram illustrating a functional configuration example of an information processing system 100.

Hereinafter, the present disclosure will be described in the following order with reference to the drawings.
A. Overview
B. System Configuration
C. About Subjective Evaluation Test
D. About Analysis of Data Regarding Individual User
D-1. Estimate Growth of Visual Experience
D-2. Detect Parameter for Image Adjustment
D-3. Estimate Parameter for Image Adjustment
E. Embodiments
E-1. Common Items in Each Embodiment
E-2. First Embodiment
E-3. Second Embodiment
F. Application Examples
F-1. First Application Example
F-2. Second Application Example
G. Configuration of Information Processing Device A. Overview A method has been known for performing sepia-tone conversion or monotone conversion on a color image as a video expression that evokes a sense of past or a retro feeling. However, such a video expression is a method that relies on constraints of a conventional recording device and does not reproduce a real human visual experience.

The present applicant considers that the visual experience is not common to all persons and the visual experience varies according to a psychological state and a physiological state of each user. Furthermore, the psychological state and the physiological state of the user change with time. The psychological state such as a preference for an image and the physiological state including human characteristics such as a height or a distance between pupils change with age, and a viewpoint of the person also changes with these changes. Therefore, a visual experience for the same target will vary for each user.

Therefore, the present disclosure provides a technology for analyzing a state of the user, estimating the state of the user when the state changes, processing an image to be adopted to the changed state, and reproducing a visual experience adopted to the state of the user.

The state of the user here includes at least one of the psychological state or the physiological state of the user. Furthermore, the change of the state basically means a change in age (aging). In the present disclosure, a psychological state and a physiological state at a current time, that is, at an actual age of the user are analyzed, and a psychological state and a physiological state of the user at a desired age are estimated. Then, by setting a parameter value for image adjustment to be adapted to the estimated psychological state and physiological state and adjusting the image on the basis of the set parameter value, a simulation experience of a viewpoint of the user at the desired age is realized. The desired age is an age at which the user desires to perform the simulation experience of the viewpoint and is basically an age in the past (for example, if user is 29 years old, five or 10 years old or the like). However, the desired age may be a future age.

The psychological state of the user is a state based on subjectivity of the user and can be acquired, for example, by conducting a subjective evaluation test on the user or analyzing a photograph captured by the user in the past. Furthermore, the physiological state of the user includes data of human characteristics regarding human development or growth such as a height, a weight, a distance between pupils of the user, for example. Data regarding visual characteristics such as visual acuity may be included in the physiological state. Specific content of the psychological state and the physiological state and details of a method for acquiring each state, a method for estimating a change of each state, or the like will be described later.

B. System Configuration

FIG. 1 schematically illustrates a functional configuration example of an information processing system 100 that reproduces (or simulation experience) of a past viewpoint of the user by applying the present disclosure. The illustrated information processing system 100 includes a user interface (UI) 110, an image input unit 120, a data accumulation unit 130, a user subjective evaluation acquisition unit 140, an analysis unit 150, an image processing unit 160, and an output unit 170. Each of the units will be described below.

The UI unit 110 includes a device that inputs information to the information processing system 100 by the user and has at least an input function and a visual presentation function. The UI unit 110 includes, for example, a personal computer (PC), a headset for augmented reality (AR) or virtual reality (VR), a multifunction information terminal such as a television, a smartphone, or a tablet, or the like. As long as necessary functional requirements are satisfied, a form of a device is not limited.

As described in the above item A, when the simulation experience of the viewpoint of the user in the past is realized, information regarding the psychological state and the physiological state at the current time, that is, at the actual age of the user is needed. These pieces of necessary information are basically input via the UI unit 100. Specifically, user personal data such as a date of birth, an age, or human characteristics (height, weight, distance between pupils, or the like of user) of the user is input via the UI unit 110. Furthermore, display of test content when the user subjective evaluation acquisition unit 140 conducts a user subjective evaluation test (to be described later) and input of an answer from the user are performed via the UI unit 110. Of course, a part of the necessary information may be input using means other than the UI unit 110. Information such as the user personal data or the physiological state of the user input via the UI unit 110 is accumulated in the data accumulation unit 130.

The image input unit 120 includes a device that inputs an image (hereinafter, simply referred to as "target image") to be a target of the simulation experience of the past viewpoint by the user (in other words, to be target of image processing). The target image includes a real-time image, a recorded image that is temporarily saved in a medium, an AR image, a VR image, or the like. The image input unit 120 includes an imaging device such as a digital still camera or a digital video camera, an image reproduction device such as a Blu-ray (BD (registered trademark) Disc) player, a connection port such as a high definition multimedia internet (HDMI) (registered trademark) interface for connecting image source devices such as the imaging device or the image reproduction device, a network interface that downloads the target image from the Internet or a cloud, or the like. The target image input via the image input unit 120 is accumulated in the data accumulation unit 130 or is real-time processed by the image processing unit 160 at a subsequent stage.

The data accumulation unit 130 is a recording device that accumulates data regarding an individual user such as the personal information acquired via the UI unit 110 or the like or the subjective evaluation results of the user acquired through the user subjective evaluation test by the user subjective evaluation acquisition unit 140, data regarding a human including statistical data or the like including transitions of a height and a weight, or the like, data regarding the target image input via the image input unit 120, and other pieces of information. Although it is assumed that the data accumulation unit 130 have a mode of a server on a cloud, the data accumulation unit 130 may be a recording device such as a hard disk installed in user local. The major data accumulated in the data accumulation unit 130 is summarized below.

Data Regarding Individual User
  Date of birth of user (age)
  Human characteristics of user (height, weight, distance between pupils, eyesight, or the like)
  Evaluation data regarding image (subjective evaluation results)
Data Regarding Human in General:
  Known statistical data regarding human characteristics (data regarding development such as average height, weight, or the like for each age)

Data Regarding Target Image:
  Image captured with camera by user
  Image data of work of art such as known painting
  Captured image of real space viewed through application The user subjective evaluation acquisition unit 140 conducts the subjective evaluation test on the user via the UI unit 110 and acquires information regarding subjective evaluation of the user. A current psychological state of the user can be grasped from the subjective evaluation results acquired by the user subjective evaluation unit 140. The subjective evaluation results acquired by the user subjective evaluation acquisition unit 140 or the information regarding the psychological state of the user calculated on the basis of the subjective evaluation results (evaluation data regarding image or the like) is accumulated in the data accumulation unit 130.

The user subjective evaluation acquisition unit 140, for example, presents a plurality of images obtained by randomly processing a basic image (known art painting data or the like) to the user, conducts the user subjective evaluation test using a question such as "please select one closest to the world you were seeing when you were about N years old", and acquires subjective evaluation of the user through an answer from the user. Details of the user subjective evaluation test will be described later.

The analysis unit 150 analyzes the data regarding the individual user read from the data accumulation unit 130 and estimates the growth of the visual experience of the user, and estimates the parameter value for image adjustment for realizing the simulation experience of the viewpoint at the desired age of the user. The desired age here is an age at which the user desires to perform the simulation experience of the viewpoint and is basically an age in the past (for example, if user is 29 years old, five or 10 years old or the like). However, the desired age may be a future age. In the configuration example illustrated in FIG. 1, the analysis unit 150 is configured to recognize and analyze the growth of the visual experience of the user from an aspect of a change of each state including the psychological state and the physiological state of the user, and includes a psychological state change analysis unit 151 and a physiological state change analysis unit 152.

Figure 2:
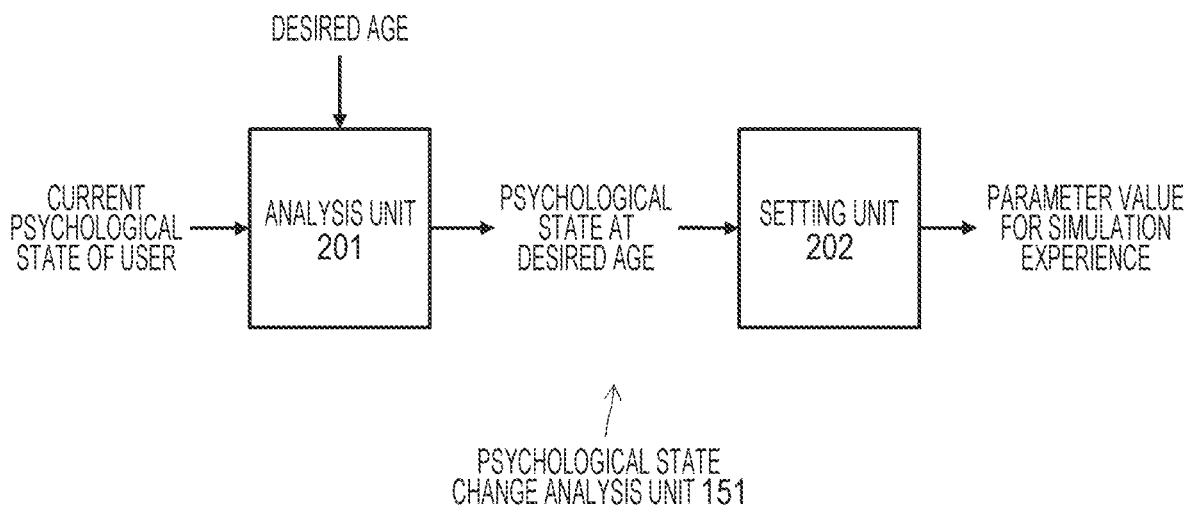
FIG. 2 is a diagram illustrating a functional configuration of a psychological state change analysis unit 151.

FIG. 2 schematically illustrates a functional configuration in the psychological state change analysis unit 151. The psychological state change analysis unit 151 includes an analysis unit 201 and a setting unit 202. The analysis unit 201 analyzes the current psychological state of the user, that is, at the actual age, on the basis of the evaluation data (described above) regarding the image of the user from the data accumulation unit 130 and estimates the psychological state of the user at the desired age. The analysis unit 201 may calculate the psychological state of the user at the desired age on the basis of a calculation formula based on knowledge regarding the evaluation data regarding the image. Alternatively, the analysis unit 201 may estimate the psychological state of the user at the desired age using a learned model (neural network or the like) that has learned a correlation between the psychological state of the human and the age in advance. Then, the setting unit 202 sets the parameter value for image adjustment for adapting the target image to the estimated psychological state at the desired age. The setting unit 202 may set the parameter value using the learned model (neural network or the like) that has learned a correlation between the psychological state of the human and the parameter value in advance. The parameter value set by the setting unit 202 is output to the image processing unit 160.

Figure 3:
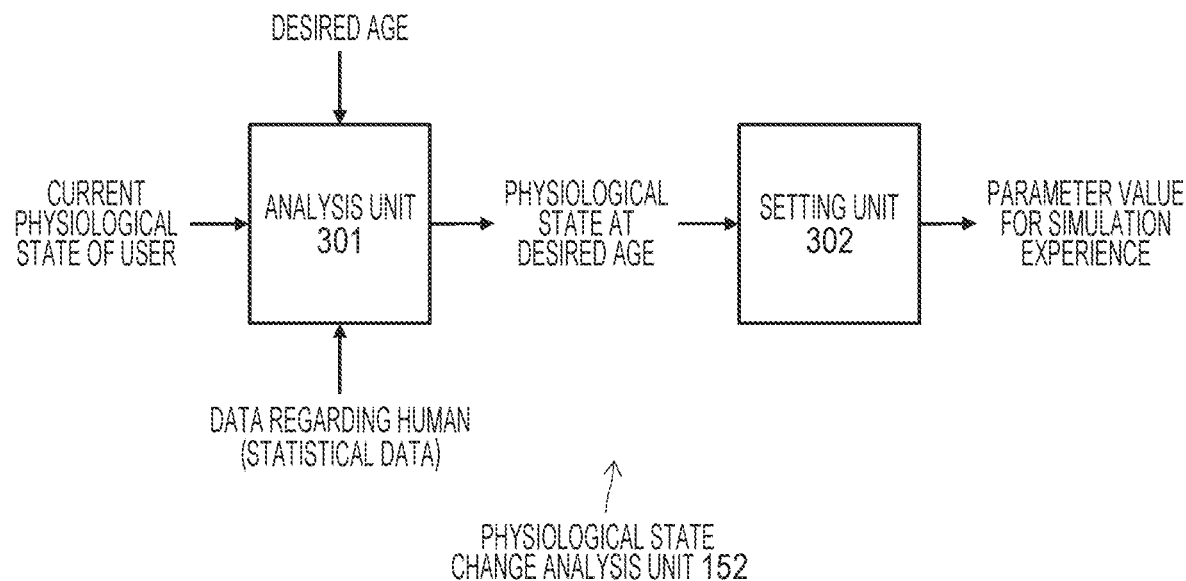
FIG. 3 is a diagram illustrating a functional configuration of a physiological state change analysis unit 152.

Furthermore, FIG. 3 schematically illustrates a functional configuration in the physiological state change analysis unit 152. The physiological state change analysis unit 152 includes an analysis unit 301 and a setting unit 302. The analysis unit 301 analyzes the current physiological state, that is, at the actual age including the data regarding the human characteristics (height or the like) of the individual user from the data accumulation unit 130 and estimates the physiological state such as the height of the user at the desired age. The analysis unit 301 may calculate the physiological state of the user at the desired age on the basis of a calculation formula based on knowledge regarding the statistical data of the human characteristics. Alternatively, the analysis unit 301 may estimate the physiological state of the user at the desired age using a learned model (neural network or the like) that has learned a correlation between the physiological state of the human and the age in advance. Then, the setting unit 302 sets the parameter value for image adjustment for adapting the target image to the estimated physiological state at the desired age. The setting unit 302 may set the parameter value using the learned model (neural network or the like) that has learned a correlation between the physiological state of the human and the parameter value in advance. The parameter value set by the setting unit 302 is output to the image processing unit 160.

The image processing unit 160 performs image adjustment on the target image, using each parameter value for image adjustment according to the changes of the psychological state and the physiological state output from the analysis unit 150 and generates an image (hereinafter, referred to as "simulation experience image") that reproduces a viewpoint (appearance) adapted to the past age of the user (for example, at the age of 10, five, or the like). However, the image processing unit 160 does not necessarily apply both of the parameter value according to the change of the psychological state and the parameter value according to the physiological change, and a case is assumed where only one of the parameter values is used. Furthermore, a type of the parameter that can be applied to the target image varies according to an attribute (for example, whether or not image is real-time image, AR image, or VR image) of the target image. However, details will be described later.

The output unit 170 outputs the simulation experience image generated by the image processing unit 160 to the screen. The output unit 170 includes, for example, a PC, a headset for AR or VR, a multifunction information terminal such as a television, a smartphone, or a tablet, or the like. As long as necessary functional requirements are satisfied, a form of a device is not limited. The output unit 170 may be the same device as the UI unit 110.

C. About Subjective Evaluation Test

The user subjective evaluation acquisition unit 140 conducts the subjective evaluation test on the user via the UI unit 110 and acquires information regarding subjective evaluation of the user. Specifically, the user subjective evaluation acquisition unit 140 presents the plurality of images obtained by randomly processing the basic image to the user and conducts the user subjective evaluation test using the question such as "please select one closest to the world you were seeing when you were about N years old".

The basic image is known art painting data or the like accumulated in the data accumulation unit 130. First, the basic image is randomly processed, and a predetermined number of images are generated. For example, the predetermined number of images may be generated from an original image, using an image generator (Generator) learned on the basis of a generative adversarial network (GAN) algorithm (for example, refer to Non-Patent Document 1) that deepens learning of input data by making two networks compete.

Then, the user subjective evaluation acquisition unit 140 presents the predetermined number of images including the basic image and the additionally generated images to the user and conducts the subjective evaluation test for making the user select one from the one closer to the world that the user was seeing when the user was about N years old, via the UI unit 110. For example, it is possible to make the user evaluate each image using a pair comparison method. In this case, the user subjective evaluation acquisition unit 140 picks up two images from the predetermined number of images and presents the images to the user, and repeatedly conducts a pair comparison test for making the user select the one closer to the world that the user was seeing when the user was N years old for all combinations of two images, via the UI unit 110. In a case where the number of images is 10, if the pair comparison is repeated by $_{10}C_2=45$ times, the images can be sorted in an order close to the world the user was seeing when the user was N years old.

D. About Analysis of Data Regarding Individual User

The analysis unit 150 performs three types of analysis including growth of the visual experience, detection of the parameter for image adjustment, and estimation of the parameter for image adjustment, using the data regarding the individual user accumulated in the data accumulation unit 130. Note that, in the above item B, the visual experience is divided into two states including the psychological state and the physiological state, and the description has been made from a viewpoint of analyzing the change of each state. In this item D, for convenience, the visual experience is collectively described without dividing the visual experience into the two states.

D-1. Estimate Growth of Visual Experience

The analysis unit 150 estimates the growth of the visual experience to estimate the past viewpoint of the user, on the basis of the data regarding the individual user and the data regarding humans in general. The data regarding the individual user is data input via the UI unit 110, the data regarding humans in general is known statistical data, and both pieces of data is accumulated in the data accumulation unit 130. The visual experience is grown due to the change of the physiological state and the change of the psychological state of the user. The processing of the analysis unit 201 in the psychological state change analysis unit 151 and the processing of the analysis unit 301 in the physiological state change analysis unit 152, described in the above item B, respectively correspond to the processing for estimating the growth of the visual experience due to the change of the physiological state of the user and that due to the change of the psychological state of the user.

For example, when visual experiences of an adult and a child are compared, differences in body size and knowledge amount cause a difference in the visual experience. Regarding the difference in the body size, a height at a desired age (for example, infant stage) is estimated from the actual age and the current height of the user, and a relative magnitude relationship with each subject imaged in the target image is obtained. The processing of the analysis unit 301 in the physiological state change analysis unit 152 described above in the item B corresponds to this processing. Then, the setting unit 302 sets a parameter value for image adjustment of each subject, so as to reproduce a viewpoint based on the body size at the desired age (for example, infant stage). Furthermore, regarding the knowledge amount, a motif that the user is interested in is estimated by analyzing a photograph imaged by the user, from a property that the user captures what the user is most interested in. The processing of the analysis unit 201 in the psychological state change analysis unit 151 corresponds to this processing. Then, the setting unit 202 estimates a parameter value for image adjustment to reproduce a viewpoint of the user based on the motif analysis result. Finally, by performing the image adjustment on the target image using the parameter value based on the subjective evaluation of the user acquired through the subjective evaluation test, the image is processed to be an image that reproduces the past viewpoint specialized for the individual user.

D-2. Detect Parameter for Image Adjustment

The analysis unit 150 detects the type of the parameter that can be adjusted for the target image that simulates the past viewpoint. A degree of freedom of processing the target image by the image processing unit 160 depends on hardware characteristics such as specifications of the output unit 170 at the subsequent stage. Furthermore, the type of the parameter that can be applied to the target image varies according to the attribute (for example, whether or not image is real-time image, AR image, or VR image) of the target image. Here, to simplify the description, general items about the parameters will be described.

Recognition of general objects including person
 Recognition of boundary region of each object
 Hue, saturation, brightness, transparency, contrast, or the like at each position of screen Furthermore, when the user subjective evaluation acquisition unit 140 conducts the user subjective evaluation test, an image to be used for the test may be generated on the basis of a parameter determined to be adjustable here.

D-3. Estimate Parameter for Image Adjustment

The analysis unit 150 finally estimates the parameter to perform the image adjustment on the target image, according to the result of the growth estimation of the visual experience and the estimation result of the parameter for image adjustment.

The parameter estimated by the analysis unit 150 is used to adjust the hue, the saturation, the brightness, the transparency, the contrast, or the like of each object (motif) in a region obtained by detecting the parameter for image adjustment (refer to item D-2 above). If it is possible under constraints such as the hardware characteristics of the output unit 170 at the subsequent stage, the estimated parameter can be used as a parameter that can adjust a size and an anteroposterior relationship of each motif. In this case, the image processing unit 160 uses such a parameter in order to process an entire screen configuration.

E. Embodiments

In this item E, two embodiments to which the present disclosure is applied in the information processing system 100 will be described.

E-1. Common Items in Each Embodiment

In this item E-1, registration processing of the data regarding the individual user for past viewpoint processing of the user, common to each embodiment, will be described. This registration processing is executed, for example, when the user starts to use the information processing system 100 or at the time of initial activation. Of course, the data regarding the individual user may be updated by periodically executing the processing, or the processing may be executing any timing when the user or the system 100 determines that the processing is necessary. The data regarding the individual user acquired through this processing is accumulated in the data accumulation unit 130.

Figure 4:
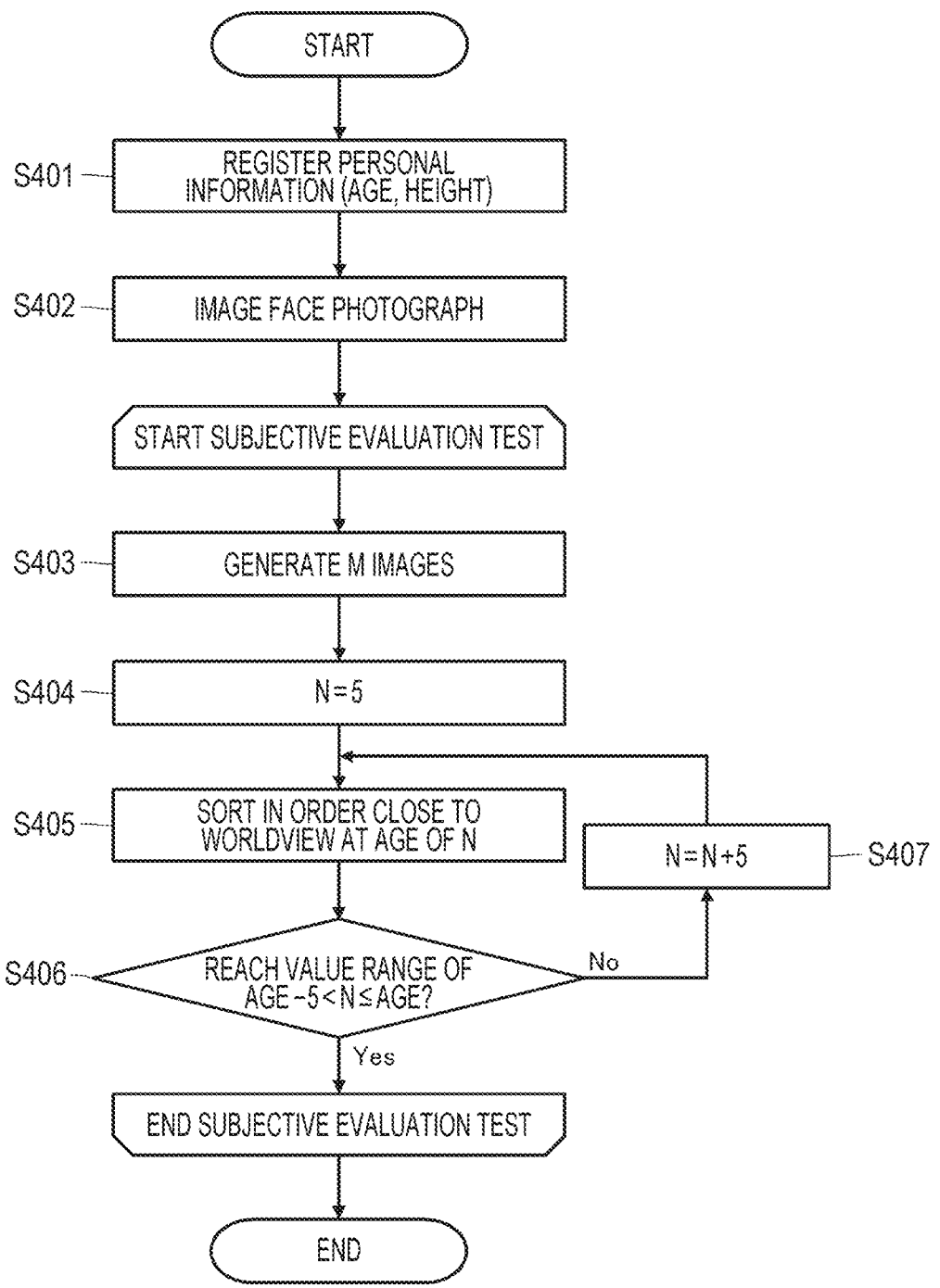
FIG. 4 is a flowchart illustrating a processing procedure for registering data regarding an individual user.

FIG. 4 illustrates a processing procedure for registering the data regarding the individual user in the information processing system 100 in a flowchart format.

First, the UI unit 110 prompts the user to input personal information such as a gender, an age, or a height and registers the input personal information as the "data regarding the individual user" (step S401). For example, it is assumed that personal information including male, 29 years old, 183 cm, . . . be input. The registration mentioned here is to accumulate the personal information in the data accumulation unit 130, in association with identification information of the user. Note that, as the personal information of the user, information necessary for user state analysis by the analysis unit 150 may be appropriately registered, in addition to the age and the height.

Next, a face photograph of the user is imaged and registered as the "data regarding the individual user" (step S402). An image file of the face photograph of the user imaged in advance may be read via the UI unit 110. The information necessary for the user state analysis, such as a distance between pupils, may be calculated from the face photograph of the user. Furthermore, face authentication processing may be executed from the face photograph of the user.

Next, the subjective evaluation test is started. The user subjective evaluation acquisition unit 140 presents the predetermined number of images including the basic image and the additionally generated images to the user and conducts the subjective evaluation test for making the user select one from the one closer to the world that the user was seeing when the user was about N years old, via the UI unit 110.

First, the user subjective evaluation acquisition unit 140 randomly processes images from the basic image and generates a predetermined number (here, M) images (step S403). The basic image is, for example, known art painting data or the like. Furthermore, for example, the M images are generated from the original image, using the image generator learned on the basis of the GAN algorithm (for example, refer to Non-Patent Document 1). Then, the user subjective evaluation acquisition unit 140 substitutes an initial value (five years old) for a variable N (step S404).

Next, the user subjective evaluation acquisition unit 140 picks up two images from the M images and presents the images to the user, and repeatedly conducts the pair comparison test for making the user select one closer to the world that the user was seeing when the user was N years old, for all the combinations of two images (step S405). In a case where the number of images is 10, if the pair comparison is repeated by $_{10}C_2=45$ times, the images can be sorted in an order close to the world the user was seeing when the user was N years old.

Then, until the N reaches value ranges of (current age of user CA-5) and (current age of user CA) (No in step S406), five is added to N (step S407), the procedure returns to step S405, and the processing for sorting the M images in an order close to the world the user was seeing when the user was N years old is repeatedly executed. For example, in a case where the user is a 29-year-old male, until N reaches an area of 29-5<N20, the pair comparison test is conducted $_{10}C_2=45$ times at each age by five years, for example, five years old, 10 years old, 15 years old, 20 years old, and 25 years old.

Then, when N reaches the value ranges of (current age of user CA-5) and (current age of user CA) (Yes in step S406), the subjective evaluation test by the user subjective evaluation acquisition unit 140 ends, and it is possible to acquire the evaluation data regarding the image at each age by five years, as the subjective evaluation results of the user. Then, the entire processing ends.

Figure 5:
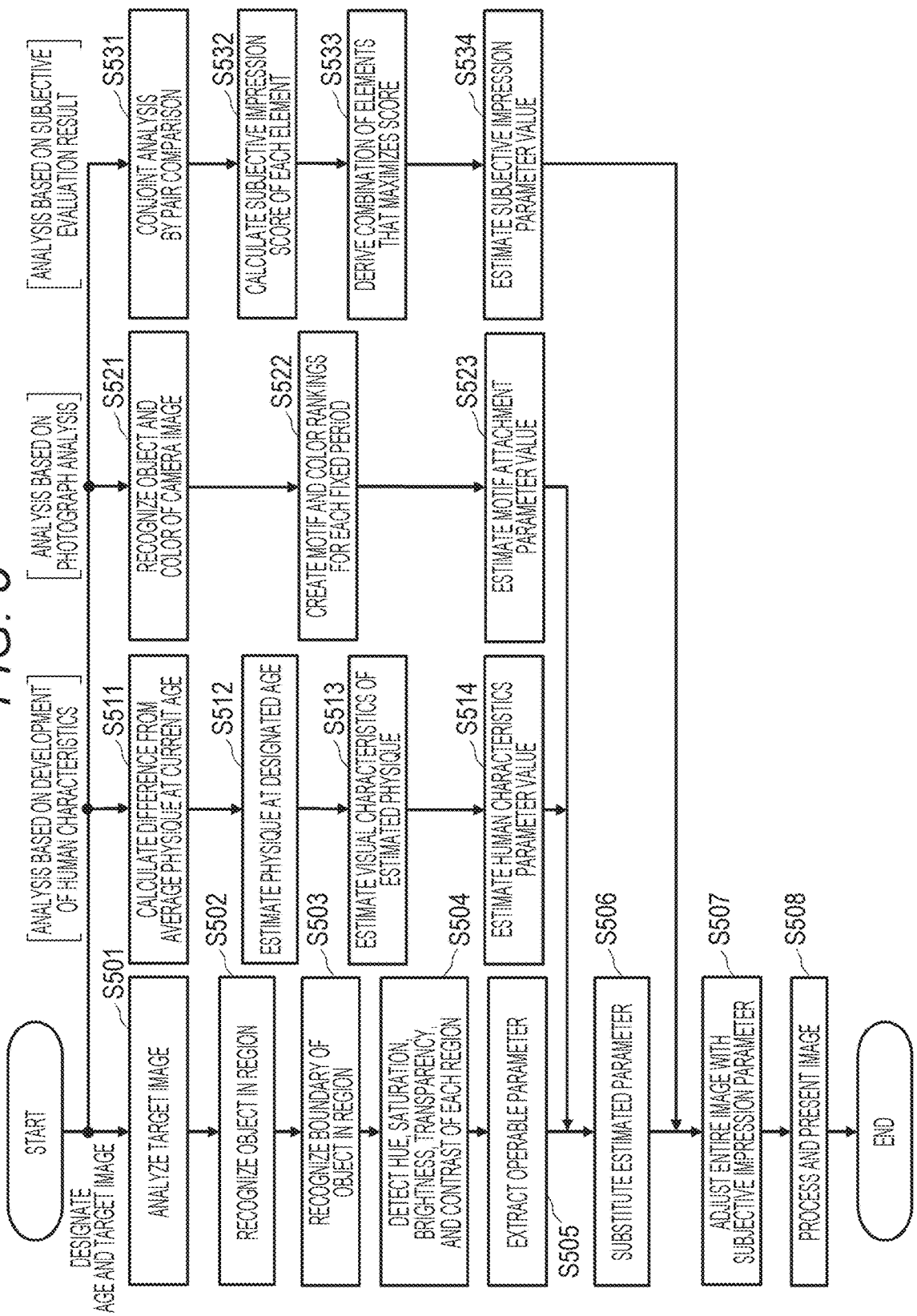
FIG. 5 is a flowchart illustrating a processing procedure for estimating a past viewpoint at the time of a desired age of the user.

FIG. 5 illustrates a processing procedure for estimating a past viewpoint of the user at the desired age in the information processing system 100 in a flowchart format. This processing is executed on the basis of the data regarding the individual user and the data regarding humans in general in the data accumulation unit 130, mainly by the analysis unit 150.

The past viewpoint estimation processing illustrated in FIG. 5 is started, for example, when the user designates an age and a target image that the user desired to perform the simulation experience. Furthermore, in the illustrated processing, each of processing including target image analysis processing, analysis (parameter value estimation) based on the development of the human characteristics of the individual user (or change of physiological state), analysis (parameter value estimation) based on analysis of a photograph imaged by the user, and analysis (parameter value estimation) based on the subjective evaluation results is executed in parallel. The analysis based on the development of the human characteristics is performed by the physiological state change analysis unit 152. Furthermore, the analysis based on the photograph analysis and the analysis based on the subjective evaluation results are performed by the psychological state change analysis unit 151.

As the target image analysis processing, first, the analysis unit 150 determines a type of the target image and analyzes a target (subject) included in the target image (step S501). As the type of the target image, it is determined whether a source of the target image is a real-time image or a recorded image, or an AR image, a VR image, or the like. This s because an operable parameter changes according to the type of the target image.

Next, the analysis unit 150 recognizes an object in each region included in the target image (step S502) and further recognizes a boundary of the object in the region (step S503). For example, the object may be recognized by semantic segmentation.

Next, the analysis unit 150 detects an average hue, hue, saturation, brightness, transparency, contrast, or the like of each region (step S504). Moreover, the analysis unit 150 extracts an operable parameter for each object (step S505). The operable parameter depends on, for example, the type of the target image (detected in step S501) or the hardware characteristics of the output unit 170.

On the other hand, as the estimation processing of the parameter value based on the development of the human characteristics of the individual user (or change of physiological state), first, the physiological state change analysis unit 152 calculates a difference between a current physique of the user and an average physique at a current age (of general human) (step S511). Next, the physiological state change analysis unit 152 estimates a physique of the user at an age at which the user desires to perform the simulation experience, on the basis of the calculation formula based on the knowledge regarding the statistical data of the human characteristics (step S512). Then, the physiological state change analysis unit 152 estimates visual characteristics of the estimated physique at the age at which it is desired to perform the simulation experience (step S513) and estimates a parameter value for image adjustment (hereinafter, referred to as "human characteristics parameter value") so as to adapt to the visual characteristics of the user at the age (step S514). The human characteristics parameter value is a parameter value for adjusting the target image so as to reproduce the visual characteristics at the age by simulating the development in terms of the human characteristics such as the physique of the user.

Furthermore, as the estimation processing of the parameter value based on the analysis on the photograph imaged by the user, first, the psychological state change analysis unit 151 reads a photograph (camera image) imaged by the user with the camera from the data accumulation unit 130 and recognizes an object and a color in each camera image (step S521). Next, the psychological state change analysis unit 151 analyzes a recognition result for each fixed period (for example, for each five years) and creates rankings of a motif (subject, composition, or the like) and a color that the user is attached to in each period (step S522). Then, the psychological state change analysis unit 151 estimates a parameter value for image adjustment (hereinafter, referred to as "motif attachment parameter value") that enhances the motif that is estimated to be attached at the age when it is desired to perform the simulation experience, on the basis of the created ranking (step S523). The motif attachment parameter value is a parameter value for adjusting the target image so as to enhance the motif unraveled and estimated from the photograph imaged by the user.

Furthermore, as the estimation processing of the parameter value based on the subjective evaluation results, first, the psychological state change analysis unit 151 performs conjoint analysis by pair comparison (step S531). Since the method of the subjective evaluation test has been already described, details will be omitted here. According to the subjective evaluation test, the M images generated from the basic image are sorted in the order closer to the world that the user was seeing at each age by five years. Next, the psychological state change analysis unit 151 calculates a subjective impression score of each element of the image, at the age when it is desired to perform the simulation experience, on the basis of the calculation formula based on the knowledge regarding the evaluation data regarding the image (step S532). Next, the psychological state change analysis unit 151 derives a combination pattern of elements that maximizes the score (step S533) and estimates a parameter value for image adjustment (hereinafter, referred to as "subjective impression parameter value") for maximizing the subjective impression score (step S534). The subjective impression parameter value is a parameter value for adjusting subjective impression regarding an atmosphere of the entire target image.

Next, the analysis unit 151 substitutes the human characteristics parameter value estimated in step S514 and the motif attachment parameter value estimated in step S523 for the parameter value extracted as operable in step S505 (step S506).

Then, after the analysis unit 151 has adjusted the entire image on the basis of the subjective impression parameter value estimated in step S534 (step S507), the image processing unit 160 processes the target image on the basis of the parameter value substituted in step S506 and outputs the target image to the output unit 170 (step S508).

Here, the past viewpoint estimation processing will be described using a case where a user who is a 29-year-old male and has a height of 183 cm desires to simulate a viewpoint when the user is five years old.

In the estimation processing of the parameter value based on the development of the human characteristics, first, the physiological state change analysis unit 152 calculates that the height 183 cm is 106% with respect to an average value of all humans as a difference from an average (of all humans) physique at the current age. Next, the physiological state change analysis unit 152 can estimate the height of the user at the age of about five as 117 cm, on the basis of the calculation formula based on the knowledge regarding the statistical data of the human characteristics. Then, the physiological state change analysis unit 152 estimates the parameter value used to adjust the hue, the saturation, the brightness, the transparency, the contrast, or the like of each object, in consideration of the viewpoint of the user at the age of five, that is, the visual characteristics, by configuring a relative magnitude relationship with the object (subject) in the target image.

Furthermore, in the estimation processing of the parameter value based on the photograph analysis, the psychological state change analysis unit 151 detects a motif or a color that is often imaged in photographs captured by the user so far, estimates an interest of the user at the age of five in the motif, from a ranking transition for each fixed period (for example, for each five years), and estimates a parameter value for image adjustment used to reproduce the interest degree.

Furthermore, in the estimation processing of the parameter value based on the subjective evaluation results, the psychological state change analysis unit 151 estimates the parameter value of each element (hue, saturation, brightness, transparency, and contrast) close to an atmosphere in memories at the age of about five, on the basis of the subjective evaluation results that the images are sorted in the order close to the world when the user is about five years old.

The analysis unit 151 substitutes the parameter value based on the development of the human characteristics and the parameter value based on the photograph analysis for the parameter operable for the target image. Then, first, the image processing unit 170 adjusts the entire image on the basis of the subjective impression parameter value and further processes the image using the substituted parameter value, and outputs the image to the output unit 170.

E-2. First Embodiment

In this item E-2, a first embodiment will be described in which a user simulates a viewpoint when the user was about five years old, for example, using an information terminal such as a smartphone or a tablet. In this embodiment, a captured image of a camera and a recorded video of a video are assumed as target images, and an image after parameter adjustment is presented on the information terminal. Therefore, a degree of freedom of image processing is high. Therefore, various parameters such as a hue, saturation, brightness, transparency, or contrast of an entire image or each object in the image can be widely adjusted on the basis of an estimated human characteristics parameter value, motif attachment parameter value, and subjective impression parameter value.

Figure 6:
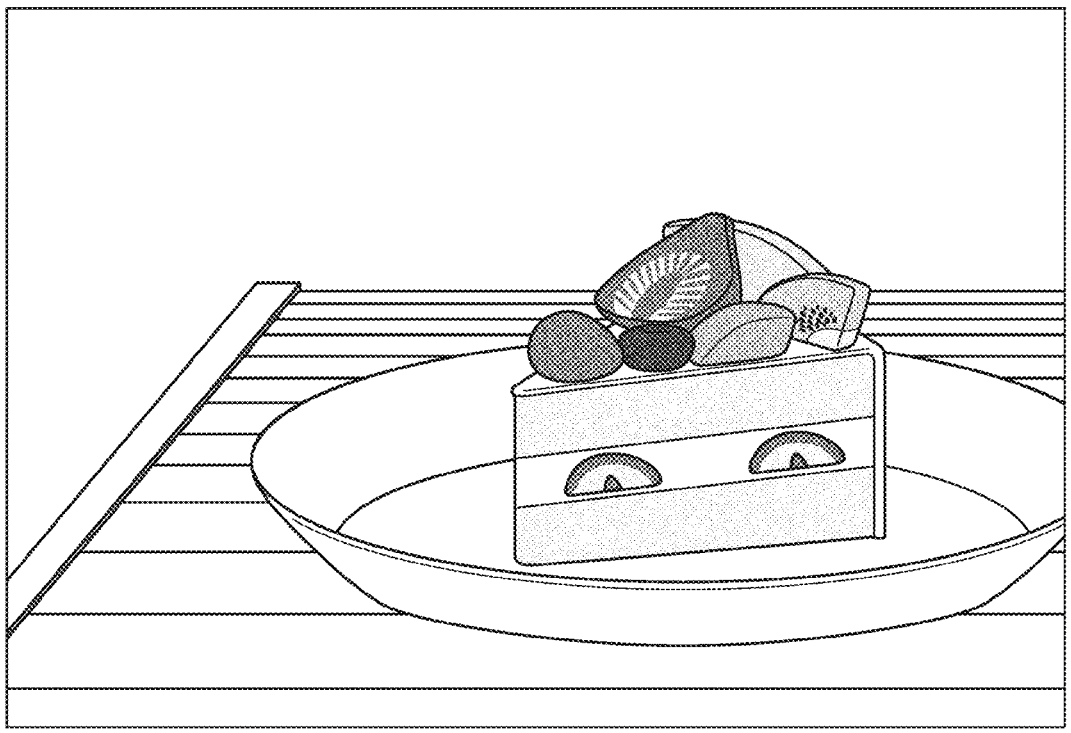
FIG. 6 is a diagram illustrating an example of a target image.
Figure 7:
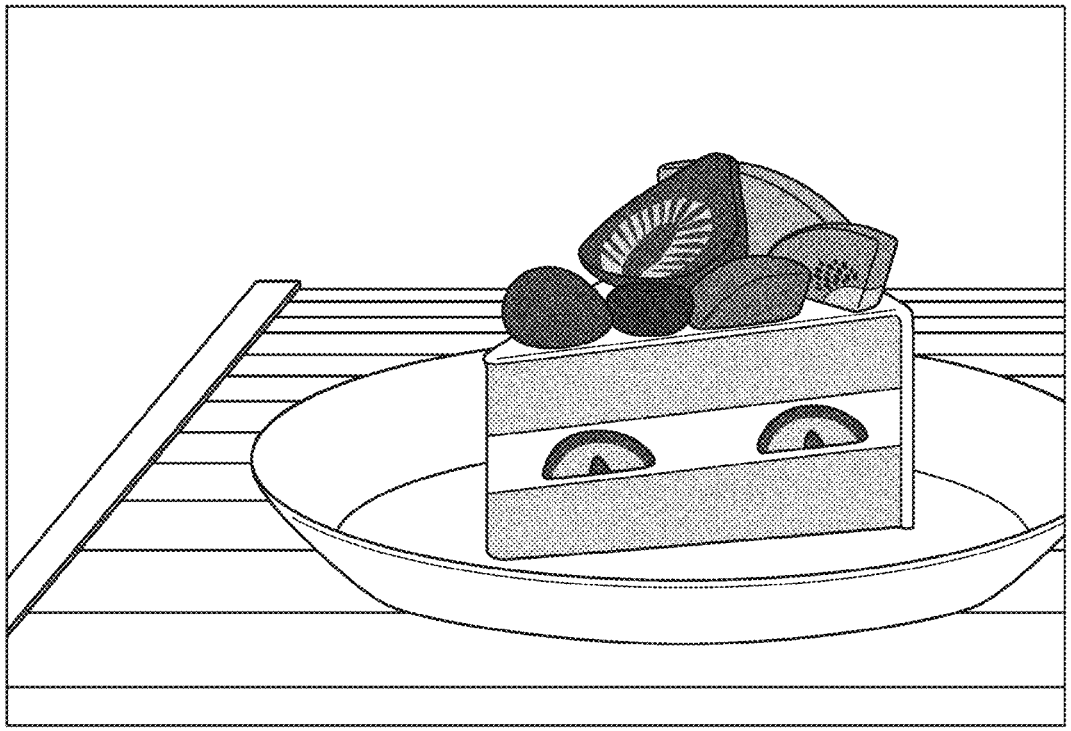
FIG. 7 is a diagram illustrating an example in which the target image illustrated in FIG. 6 is processed to reproduce a viewpoint of the user when the user was about five years old.

FIG. 6 illustrates an original photograph (that is, before image adjustment) that is the target image. Furthermore, FIG. 7 illustrates an image obtained by performing image adjustment on the photograph illustrated in FIG. 6 on the basis of the present disclosure. Through the processing in steps S511 to S514 in the flowchart illustrated in FIG. 5, a height of the user at the age of about five is estimated, and the human characteristics parameter value used to reproduce a viewpoint at the height is set. Furthermore, through the processing in steps S521 to S523 in the same flowchart, motif and color rankings when the user is about five years old is created, and the motif attachment parameter value is set. As a result, in FIG. 7, a cake that is a motif is adjusted to be larger as the user at the age of about five is smaller than the present, and an entire color temperature is adjusted to be a warm color direction. Furthermore, through the processing in steps S531 to S534 in the same flowchart, regarding a fruit on the cake that is the motif, a subjective evaluation result (evaluation regarding image) such that the fruit has appeared to be vividly shining for the user in the past is obtained, and the brightness of the entire image is improved in FIG. 7.

E-3. Second Embodiment

In this item E-3, a second embodiment will be described in which a user simulates a viewpoint when the user is about five years old, using an AR device. In this embodiment, processing is executed using a real-time image captured by a camera or an image in a real space viewed through an AR glass as a target image. In such a case, when physical properties such as a size or a shape of each object in the target image are largely changed, the real space is distorted, and there is a possibility that this gives a sense of discomfort to the user. Therefore, a degree of freedom of image processing is restricted. For example, the degree of freedom is limited to only adjustment of a hue, saturation, and brightness of an entire image and each object in an image. Furthermore, as other specific constraints, a point that relative magnitude and positional relationships between objects included in the target image are not operable and a point that it is not possible to use a size or a front/back of a layer for a strength of a motif are exemplified.

Here, a case will be described as an example in which an AR image is adjusted in a situation setting in which a religious picture exhibited in a museum is appreciated. First, a frame is detected from the AR image, and an inside of the frame is set as a picture region. Next, since a movement of a user's face or the like often occurs after detecting each motif in the picture region, an error width is provided for a boundary on the basis of a shape of the motif, and the error width is set as a boundary region. Then, the processing of the AR image is limited to adjustment via a filter such as a hue, saturation, or brightness, so as not to cause inconsistency with a real space. In a case where an impression of the main motif in the religious picture is strong, adjustment is performed on an innermost region of the boundary region of this motif.

F. Application Examples

In this item F, two application examples of the present disclosure implemented in the information processing system 100 will be described.

F-1. First Application Example

In this item F-1, a first application example will be described in which a user simulates a viewpoint when the user is about five years old using a VR device. In this application example, a situation is set in which the user enjoys a VR space that reproduces a house where the user has lived in the past.

Unlike the AR image described in the above item E-2, in the VR image, the user easily allows a distortion of a virtual space, and a degree of freedom of image processing is high. Therefore, it is possible to adjust a parameter used to determine an impression of an entire image such as a color tone, to move a viewpoint position of the user, and to operate a size of an object in the VR space. Moreover, an operation of relative magnitude and positional relationships between objects included in the VR image and an operation of a size or a front/back of a layer for a strength of a motif may be permitted.

In the VR space that reproduces the house where the user has lived in the past, an entire space displayed by the VR device is defined as a processable region. The VR device to which the present disclosure is applied can present a VR image in which a subjective viewpoint of the user in his/her childhood can be simulated in a form close to a memory of the user, by operating a parameter such as a color of each object, a color of a light source, and a height of the viewpoint of the user, or the like in the VR space on the basis of an estimation result of a human characteristics parameter value.

F-2. Second Application Example

By executing the processing illustrated in FIG. 5 every time (for example, for each target image), image adjustment tuned up for personal data of the user at that time can be implemented. However, a calculation load is generated each time.

On the other hand, when the processing is repeated, there is a case where it is found that there are a motif and an image adjustment filter that gives a good impression to the user invariably over time. Therefore, by applying such a motif and a filter to a new target image, a filter having a visual effect that is highly likely to reproduce a past viewpoint of the user and gives a good impression is generated, and it is possible to present an image that reproduces the past viewpoint of the user. As a result, on the new target image, image adjustment personalized for a past visual experience of each user can be performed while reducing a calculation amount.

G. Configuration of Information Processing Device

Figure 8:
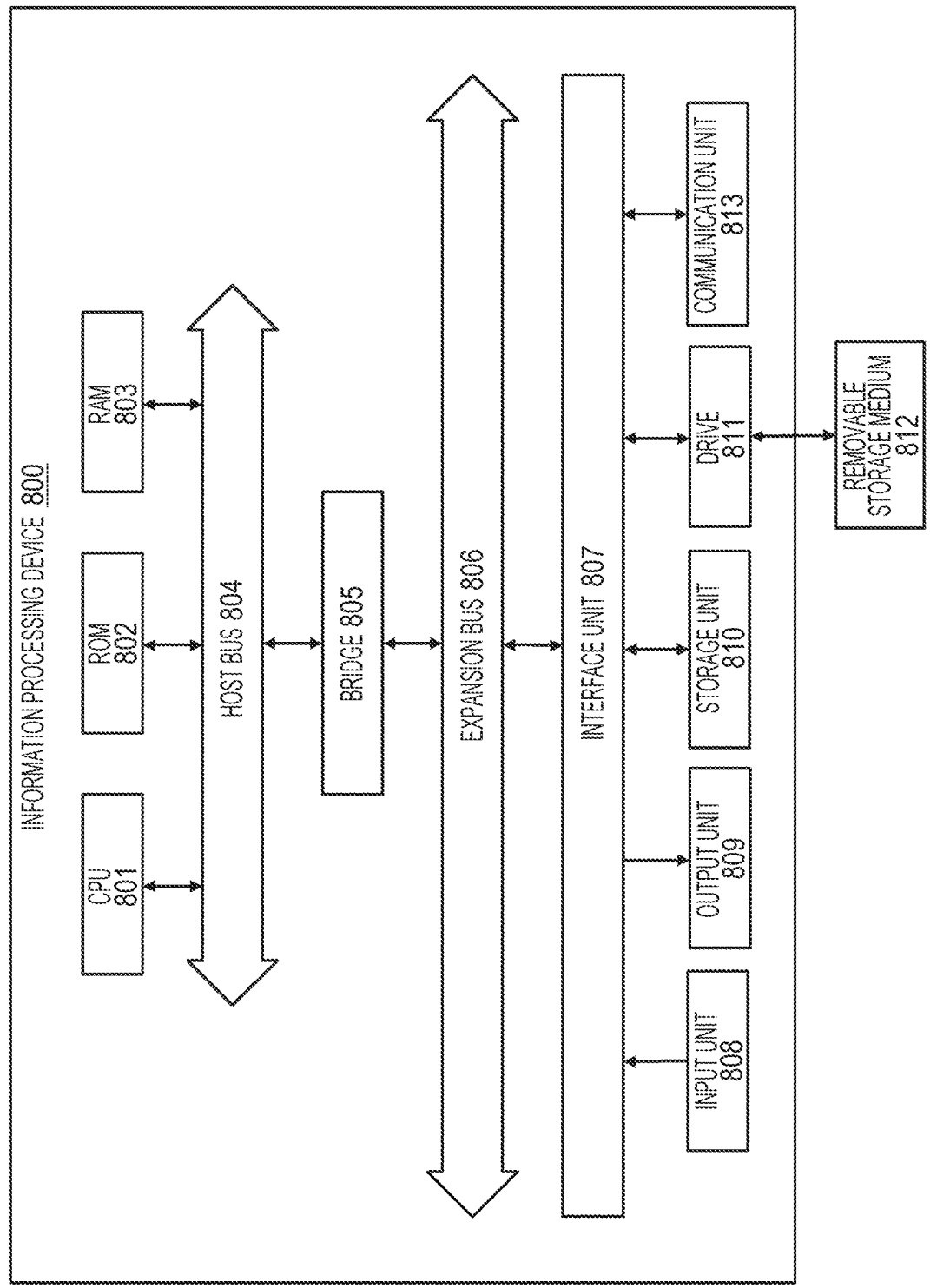
FIG. 8 is a diagram illustrating a functional configuration of an information processing device 800.

FIG. 8 schematically illustrates a functional configuration of the information processing device 800 to which the present disclosure is applied. The information processing device 800 mainly implements the functions of the UI unit 110, the analysis unit 150, the image processing unit 160, and the output unit 170, in the information processing system 100 illustrated in FIG. 1. The information processing device 800 includes, for example, a PC, a headset for AR or VR, a multifunction information terminal such as a television, a smartphone, or a tablet, or the like.

The illustrated information processing device 800 includes a central processing unit (CPU) 801, a read only memory (ROM) 802, a random access memory (PAM) 803, a host bus 804, a bridge 805, an expansion bus 806, an interface unit 807, an input unit 808, an output unit 809, a storage unit 810, a drive 811, and a communication unit 813. Hereinafter, each unit in the information processing device 800 will be described.

The CPU 801 functions as an arithmetic processing device and a control device, and controls all operations of the information processing device 800 according to various programs. The ROM 802 stores, in a nonvolatile manner, programs (a basic input-output system and the like), operation parameters, and the like to be used by the CPU 801. The RAM 803 is used to load a program to be used in execution by the CPU 801, and temporarily store parameters such as working data that appropriately changes during program execution. Examples of the program loaded into the RAM 803 and executed by the CPU 801 include various application programs, an operating system (OS), and the like.

The CPU 801, the ROM 802, and the RAM 803 are interconnected by the host bus 804 formed with a CPU bus or the like. Then, the CPU 801 operates in conjunction with the ROM 802 and the RAM 803, to execute various application programs under an execution environment provided by the OS, and provide various functions and services. In a case where the information processing device 800 is a PC, the OS is, for example, Windows of Microsoft Corporation. In a case where the information processing device 800 is a smartphone or a tablet, the OS is Android of Google Inc., for example.

The host bus 804 is connected to the expansion bus 806 via the bridge 805. The expansion bus 806 is, for example, PCI Express formulated by the PCI-SIG. However, the information processing device 800 does not necessarily have a configuration in which circuit components are separated by the host bus 804, the bridge 805, and the expansion bus 806, but almost all circuit components may be interconnected by a single bus (not illustrated) in the configuration.

The interface unit 807 connects peripheral devices such as the input unit 808, the output unit 809, the storage unit 810, the drive 811, and the communication unit 813 according to the standard of the expansion bus 806. However, in order for the information processing device 800 to operate as an information terminal such as a smartphone or a tablet, not all the peripheral devices illustrated in FIG. 8 are necessary, and the information processing device 800 may further include a peripheral device not illustrated. Furthermore, the peripheral devices may be included in a main body of the information processing device 800, or some of the peripheral devices may be externally connected to the main body of the information processing device 800.

The input unit 808 is formed with an input control circuit or the like that generates an input signal on the basis of an input from a user, and outputs the input signal to the CPU 801. In a case where the information processing device 800 is an information terminal such as a smartphone or a tablet, the input unit 808 is a touch panel or a microphone, for example, but may further include another mechanical operator such as a button. Furthermore, in a case where the information processing device 800 is an information terminal such as a smartphone or a tablet, a camera may be included in the input unit 808.

The output unit 809 includes a display device such as a liquid crystal display (LCD) device, an organic electro-luminescence (EL) display device, or a light emitting diode (LED), for example, and displays various types of data such as video data in a form of an image or a text, or displays a graphical user interface (GUI) screen. Furthermore, the output unit 809 also includes an audio output device such as a speaker, headphones, or the like, and converts audio data or the like into a voice to be output.

The storage unit 810 stores files such as programs (applications, OS, middleware, and the like) to be executed by the CPU 801 and various types of data. The storage unit 810 includes a mass storage device such as a solid state drive (SSD), for example, but may include an external storage device such as a hard disk drive (HDD).

A removable storage medium 812 is a cartridge-type storage medium such as a microSD card, for example. The drive 811 performs read and write operations on the removable storage medium 813 mounted therein. The drive 811 outputs data (for example, target image or the like) read from the removable recording medium 812 to the RAM 803 and writes data on the RAM 803 in the removable recording medium 812.

The communication unit 813 is a device that performs wireless communication such as a cellular communication network of 4G, 5G, or the like, Wi-Fi (registered trademark), or Bluetooth (registered trademark). Furthermore, the communication unit 813 includes a terminal such as an HDMI (registered trademark) and may further include a function for performing the HDMI (registered trademark) communication with a display or the like.

INDUSTRIAL APPLICABILITY

The present disclosure has been described in detail with reference to the specific embodiments. However, it is obvious that those skilled in the art can make modifications and substitutions of the embodiment without departing from the scope of the present disclosure.

Here, although the present disclosure has been described mainly using the embodiment in which the past viewpoint of the user is simulated, the gist of the present disclosure is not limited to this. For example, in a case where a future viewpoint of the user is simulated or a case where it is desired to simulate a viewpoint of a person other than the user, the present disclosure can be similarly applied, and the simulation experience can be preferably realized. Moreover, to a case where other five senses such as a hearing sense other than a vision sense is simulated, the present disclosure can be similarly applied.

In short, the present disclosure has been described in an illustrative manner, and the contents disclosed in the present specification should not be interpreted in a limited manner. To determine the subject matter of the present disclosure, the claims should be taken into consideration.

Note that the present disclosure may also have the following configurations.

(1) An information processing device including:
an analysis unit that analyzes a state of a user and estimates a changed state of the user;
a setting unit that sets a parameter value for image adjustment so as to be adapted to the changed state; and
an adjustment unit that adjusts a parameter of a target image on the basis of the parameter value set by the setting unit.

(2) The information processing device according to (1), in which
a change of the state includes a change according to an age of the user,
the analysis unit analyzes a state of the user at a current age and estimates a state of the user at another age, and
the setting unit sets a parameter value so as to be adapted to the state of the user at the another age.

(3) The information processing device according to (1), in which
the analysis unit estimates the changed state of the user, on the basis of personal data of the user and general human characteristic data.

(4) The information processing device according to (3), further including:
an input unit that inputs the personal data of the user, in which
the analysis unit analyzes the state of the user, on the basis of the personal data of the user input via the input unit.

(5) The information processing device according to any one of (1) to (4), in which
the state of the user includes at least one of a psychological state or a physiological state of the user,
the analysis unit estimates a change of at least one of the psychological state or the physiological state of the user, and
the setting unit sets a parameter value so as to adapt to the changed psychological state and physiological state.

(6) The information processing device according to any one of (1) to (5), in which
the analysis unit analyzes human characteristics data of the user including a current height and estimates human characteristics data of the user at a desired age, and
the setting unit sets a first parameter value used to reproduce a viewpoint based on human characteristics of the user at the desired age.

(7) The information processing device according to (6), in which
the analysis unit analyzes a camera image captured by the user and estimates a motif and a color attached by the user for each fixed period, and
the setting unit estimates a second parameter value that designates a motif and a color attached by the user at the desired age.

(8) The information processing device according to (7), in which
the adjustment unit performs adjustment for reproducing a viewpoint based on human characteristics of the user at the desired age, on the motif that is attached by the user at the desired age among objects included in the target image, on the basis of the first parameter value and the second parameter value.

(9) The information processing device according to any one of (1) to (8), in which
the analysis unit analyzes a subjective evaluation result for the user,
the setting unit sets a third parameter value for enhancing a subjective impression, and
the adjustment unit adjusts an entire target image on the basis of the third parameter value.

(10) The information processing device according to (9), further including:
a subjective evaluation acquisition unit that presents a plurality of images to the user and acquires subjective evaluation of the user on the basis of a result of selecting the images in order close to a world that the user sees in the changed state.

(11) The information processing device according to any one of (1) to (10), in which
the adjustment unit adjusts the target image under a constraint based on a device that outputs an adjusted image or a type of the target image.

(12) The information processing device according to (11), in which
in a case where an image is output to an AR device, in a case where the target image is a real-time image or an image of a real space, the adjustment unit adjusts the target image under at least one of constraints (a) to (c) below,
(a) adjust only hue, saturation, and brightness of the target image (b) does not operate relative magnitude and positional relationships between objects included in the target image, (c) does not use a size and front/back of a layer for a strength of the motif.

(13) An information processing method including:

an analysis step of analyzing a state of a user and estimating a changed state of the user;

a setting step of setting a parameter value for image adjustment so as to be adapted to the changed state; and an adjustment step of adjusting a parameter of a target image on the basis of the parameter value set in the setting step.

(14) A computer program written in a computer-readable format for causing a computer to function as:

an analysis unit that analyzes a state of a user and estimates a changed state of the user;

a setting unit that sets a parameter value for image adjustment so as to be adapted to the changed state; and an adjustment unit that adjusts a parameter of a target image on the basis of the parameter value set by the setting unit.

REFERENCE SIGNS LIST

100 Information processing system
110 Input unit
120 Image input unit
130 Data accumulation unit
140 User subjective evaluation acquisition unit
150 Analysis unit
151 Psychological state change analysis unit
152 Physiological state change analysis unit
160 Image processing unit
170 Output unit
201 Analysis unit
202 Setting unit
301 Analysis unit
302 Setting unit
800 Information processing device
801 CPU
802 ROM
803 RAM
804 Host bus
805 Bridge
806 Expansion bus
807 Interface unit
808 Input unit
809 Output unit
810 Storage unit
811 Drive
812 Removable recording medium
813 Communication unit

The invention claimed is:

1. An information processing device, comprising:
a Central Processing Unit (CPU) configured to:
determine a subjective evaluation result, wherein
the determined subjective evaluation result is based on a sorting order associated with a user selection process of a plurality of images presented to a user, and
the sorting order of the plurality of images is based on a world that the user sees in a changed state;
analyse a state of the user based on the subjective evaluation result;
estimate the changed state of the user based on the analysis;
set a first parameter value, of a first parameter, for image adjustment to adapt a target image to the changed state; and
adjust the first parameter of the target image, based on the set first parameter value.

2. The information processing device according to claim 1, wherein
the changed state is based on an age of the user;
the CPU is further configured to:
analyse the state of the user at a current age of the user;
estimate the changed state of the user at a specific age of the user, wherein the specific age is different from the current age; and
set a second parameter value, of a second parameter, to be adapted to the state of the user at the specific age.

3. The information processing device according to claim 1, wherein the CPU is further configured to estimate the changed state of the user, based on personal data of the user and general human characteristic data.

4. The information processing device according to claim 3, wherein the CPU is further configured to:
receive the personal data of the user; and
analyse the state of the user, based on the personal data of the user.

5. The information processing device according to claim 1, wherein
the state of the user includes at least one of a psychological state of the user or a physiological state of the user, and
the CPU is further configured to:
estimate a change of at least one of the psychological state of the user or the physiological state of the user; and
set a third parameter value, of a third parameter, to adapt to the changed psychological state and the changed physiological state.

6. The information processing device according to claim 1, wherein the CPU is further configured to:
analyse human characteristics data of the user including a current height of the user; and
estimate the human characteristics data of the user at a specific age; and
set a fourth parameter value, of a fourth parameter, to reproduce a first viewpoint based on the estimated human characteristics of the user.

7. The information processing device according to claim 6, wherein the CPU is further configured to:
analyse a camera image captured by the user;
estimate a motif and a color attached to the user for a fixed period; and
estimate a fifth parameter value, of a fifth parameter, that designates the motif and the color attached by the user at the specific age.

8. The information processing device according to claim 7, wherein the CPU is further configured to perform, based on the fourth parameter value and the fifth parameter value, adjustment for reproduction of a second viewpoint based on the estimated human characteristics of the user at the specific age, on the motif that is attached by the user at the specific age among objects included in the target image.

9. The information processing device according to claim 1, wherein the CPU is further configured to:
set a sixth parameter value, of a sixth parameter, to enhance a subjective impression of the target image; and
adjust the target image entirely, based on the sixth parameter value.

10. The information processing device according to claim 1, wherein
the CPU is further configured to adjust the target image under a constraint, based on at least one of a device that outputs an adjusted image or a type of the target image.

11. The information processing device according to claim 10, wherein
the target image is output to an augmented reality (AR) device,
the target image is one of a real-time image or an image of a real space, and
the CPU is further configured to adjust the target image, based on at least one of:
adjustment of adjust only hue, saturation, and brightness of the target image,
a first constraint that relative magnitude and positional relationships, between objects included in the target image, are not operable, or
a second constraint that a size and one of a front or a back of a layer for a strength of a motif are not usable.

12. An information processing method, comprising:
determining a subjective evaluation result, wherein
the determined subjective evaluation result is based on a sorting order associated with a user selection process of a plurality of images presented to a user, and
the sorting order of the plurality of images is based on a world that the user sees in a changed state;
analyzing a state of the user based on the subjective evaluation result;
estimating the changed state of the user based on the analysis;
setting a parameter value, of a parameter, for image adjustment to adapt a target image to the changed state; and
adjusting the parameter of the target image, based on the set parameter value.

13. A non-transitory computer-readable medium having stored thereon, computer-executable instructions which, when executed by a computer, cause the computer to execute operations, the operations comprising:
determining a subjective evaluation result, wherein
the determined subjective evaluation result is based on a sorting order associated with a user selection process of a plurality of images presented to a user, and
the sorting order of the plurality of images is based on a world that the user sees in a changed state;
analysing a state of the user based on the subjective evaluation result;
estimating the changed state of the user based on the analysis;
setting a parameter value, of a parameter, for image adjustment to adapt a target image to the changed state; and
adjusting the parameter of the target image, based on the set parameter value.

* * * * *